United States Patent [19]

Michaels et al.

[11] Patent Number: 4,988,443
[45] Date of Patent: Jan. 29, 1991

[54] BIOREACTOR PROCESS FOR CONTINUOUS REMOVAL OF ORGANIC TOXICANTS AND OTHER OLEOPHILC SOLUTES FROM AN AQUEOUS PROCESS STREAM

[75] Inventors: Alan S. Michaels, Chestnut Hill, Mass.; Steven W. Peretti, Durham; Christopher J. Tompkins, Raleigh, both of N.C.

[73] Assignee: North Carolina State University, Raleigh, N.C.

[21] Appl. No.: 547,862

[22] Filed: Jul. 3, 1990

[51] Int. Cl.$^5$ .............................................. C02F 3/34
[52] U.S. Cl. ...................................... 210/611; 210/615; 210/631; 210/638; 210/654; 210/908; 435/182; 435/267; 435/271
[58] Field of Search ............... 210/610, 611, 614, 615, 210/618, 631, 638, 645, 648–654, 908, 909; 435/182, 252.3, 252.8, 267, 271, 284

[56] References Cited

U.S. PATENT DOCUMENTS

| | | | |
|---|---|---|---|
| 3,580,840 | 5/1971 | Uridil | 210/611 |
| 4,266,026 | 5/1981 | Breslau | 435/99 |
| 4,416,993 | 11/1983 | McKeown | 210/611 |
| 4,440,853 | 4/1984 | Michaels et al. | 435/68 |
| 4,442,206 | 4/1984 | Michaels et al. | 435/68 |
| 4,481,292 | 11/1984 | Raymond | 435/147 |
| 4,647,539 | 3/1987 | Bach | 435/284 |
| 4,756,831 | 7/1988 | Menzel et al. | 210/617 |
| 4,804,628 | 2/1989 | Cracauer et al. | 435/240 |
| 4,936,996 | 6/1990 | Messing | 210/611 |
| 4,956,093 | 9/1990 | Pirbazan et al. | 210/631 |

Primary Examiner—Tom Wyse
Attorney, Agent, or Firm—Richard E. Jenkins

[57] ABSTRACT

A hollow fiber membrane bioreactor process for continuous selective removal of organic toxicants or other oleophilic solutes present in an aqueous process stream wherein low concentration levels of said toxicant are removed from the aqueous process stream by being extracted and concentrated by the permeably selective hollow fiber membrane and then provided to a microorganism for metabolization into a water soluble metabolite. The water soluble metabolite is prevented from reentering the aqueous process stream and removed from the bioreactor in the aqueous nutrient effluent stream.

27 Claims, 2 Drawing Sheets

BIOREACTOR PROCESS FOR CONTINUOUS REMOVAL OF ORGANIC TOXICANTS AND OTHER OLEOPHILC SOLUTES FROM AN AQUEOUS PROCESS STREAM

TECHNICAL FIELD

This invention relates to microbiological methods using hollow fiber membrane bioreactors to selectively remove organic toxicants and other oleophilic solutes from an aqueous process stream.

DESCRIPTION OF THE PRIOR ART

Bioreactors which utilize microorganisms to achieve desired biochemical processes are generally well known. For example, U.S. Pat. No. 4,440,853 to Michaels et al. discloses a method for microbiologically processing organic materials to produce certain products. Hollow fibers having semipermeable membranes are disposed within the flow reactor and supported by a sponge structure which serves as a housing environment for microorganisms. A nutrient medium containing substrates to be processed is passed through the lumens of the hollow fibers wherein the nutrients and substrates diffuse through the semipermeable membranes into the microorganism environment. The substrates are processed into metabolic products within the sponge by the microorganisms, and the metabolic products then diffuse back through the fiber membranes into the lumens. The effluent from the fiber lumens is processed in order to isolate the desired products.

U.S. Pat. No. 4,442,206 to Michaels et al. discloses a method for growing microbial cells which utilizes a plurality of hollow fibers disposed within a chamber inoculated with cells. A nutrient medium stream having a pressure greater than the pressure of the nutrient medium within the chamber is passed through the hollow fibers such that the nutrient medium stream flows through the hollow fibers upon entry into the chamber and the microbial cells within the chamber metabolize the nutrients in the nutrient medium stream into desired products. The pressure in the nutrient medium stream is subsequently reduced to a level below the pressure of the product-containing spent nutrient medium in the chamber and the product-containing spent nutrient medium reenters the lumens of the hollow fibers adjacent the exit port of the chamber so as to pass from the chamber with the effluent from the lumens.

Also of interest, U.S. Pat. No. 4,481,292 to Raymond discloses a process for the enzyme-catalyzed conversion of ethanol to acetaldehyde which utilizes a plurality of hollow fibers disposed within a cartridge shell. An ethanol-containing substrate is passed through the lumens of the hollow fibers within the cartridge. The substrate diffuses into the chamber as it passes through the lumens of the hollow fibers, and it reacts with an enzyme therein so as to be converted to a desired product which then reenters the lumens of the hollow fibers so as to exit the cartridge.

Of additional interest, U.S. Pat. No. 4,647,539 to Bach discloses a method and apparatus for cultivating cells in vitro. The device comprises a shell constructed of a flexible material having a plurality of capillaries disposed therein, and the space within the shell surrounding the fibers is inoculated with cells. A nutrient medium containing oxygen and other stimuli is passed through the lumens of the hollow fibers. Simultaneously the container is flexed so as to cause the capillaries to move away from one another and enhance the transfer of nutrients and oxygen to the cell-containing space and also to facilitate the transfer of the waste products produced from the cells back into the lumens of the hollow fibers where they are removed from the system with the lumen effluent.

However, a hollow fiber membrane reactor which is capable of selectively removing very low levels of an organic toxicant or other oleophilic solute from an aqueous process stream, concentrating the solute in the fiber membrane and transporting the solute therethrough to be transformed by microorganisms provided within the bioreactor shell, and removing the metabolite product formed by the microorganisms without allowing the product to reenter the aqueous process stream has not been discovered prior to applicants' invention.

DISCLOSURE OF THE INVENTION

A method is provided for continuously and selectively removing organic toxicants or other oleophilic solutes from an aqueous process stream by employing microorganisms in a flow reactor to convert the toxicants or solutes into water soluble metabolites. The flow reactor comprises one or more permeably selective hollow fiber membrane modules having an inlet port and an outlet port for admitting and removing an aqueous process stream to and from the lumen side thereof, microorganisms operatively associated with the outside surface of said semipermeable hollow fiber membrane, and a housing surrounding said hollow fiber membrane and microorganisms and having an inlet port for providing an aqueous nutrient-containing flow to said housing and said microorganisms and an outlet port for removal of said nutrient flow and waste metabolites from said housing. The process comprises the steps of continuously providing an aqueous process stream containing a low water solubility organic toxicant or other organic solute therein to the lumen side of the hollow fiber membrane module; continuously providing an aqueous nutrient stream comprising a water soluble nutrient to the shell side of the microorganism-containing membrane module; selectively transporting the low water solubility solutes (either directly or via a recirculating water immiscible organic solvent) through the hollow fiber membrane to the microorganisms to be metabolized while preventing transportation of the water soluble nutrients and metabolites in the housing through the hollow fiber membrane into the aqueous process stream, wherein the hollow fiber membrane further serves to concentrate the low water soluble solute therein during transportation therethrough; continuously removing the stripped or detoxified aqueous process stream through the outlet port of the hollow fiber membrane module; and continuously removing the aqueous nutrient stream and metabolites contained therein through the outlet port of the shell side of the microorganism-containing membrane module.

It is therefore an object of the present invention to provide a hollow fiber membrane bioreactor process for selectively removing a low concentration of organic solute from an aqueous solution containing that solute, and biologically transforming that solute into a different chemical species.

It is another object of the present invention to provide a hollow fiber membrane bioreactor process for selectively removing a very low concentration of toxicant from a contaminated aqueous stream and transferring that toxicant into a separate compartment for biological processing by selected microorganisms present therein into a water soluble metabolite which is removed with the aqueous effluent from that compartment.

Some of the objects of the invention having been stated, other objects will become evident as the description proceeds, when taken in connection with the accompanying drawings.

BEST MODE FOR CARRYING OUT THE INVENTION

Historically, one of the major obstacles to the utilization of immobilized cell bioreactors for the removal of xenobiotic toxicants such as chlorinated hydrocarbons from waste water or process effluents is the difficulty of transporting the toxicant (which is usually of very low water solubility and present in exceedingly low concentration in the waste stream to be treated — e.g., between about 5 and 10,000 ppm) to the metabolizing organisms at an adequately high rate, while at the same time maintaining the aqueous environment surrounding the microorganisms sufficiently concentrated in essential nutrients and metabolic regulators to ensure their maximal capacity to metabolize the toxicant. Since the toxicant-containing feed to the reactor cannot be the primary source of nutrients for the biomass for economic reasons, a means must be found for isolating the toxicant-bearing and nutrient-bearing aqueous phases from each other in a manner which permits the toxicant present in the former, and the nutrients present in the latter, to reach the biomass without concomitant transport of water soluble species (nutrients, metabolites) between the two phases.

Moreover, in many instances, the microorganisms of choice for the metabolic destruction of pollutants of this type are fastidious and susceptible to destruction by materials which may be present in the feed stream, and thus their isolation is very important. In addition, recombinant organisms will, for reasons of environmental safety, have to be employed in bioreactor systems which will provide protection against escape of viable cells into the open environment. Thus, a bioreactor suitable for this application must both (1) provide protection of the active biomass from contamination by adventitious organisms or other toxic components present in the aqueous stream being processed, and (2) confine the biomass safely within the bioreactor enclosure.

Applicants have conceived of a bioreactor process which combines the concepts of cell-immobilization, selective transport of specific solutes via the use of permselective membranes, and carefully engineered fluid manipulation to facilitate mass transfer, which meets the objectives articulated above, and which is described in specificity below.

Figure 1:
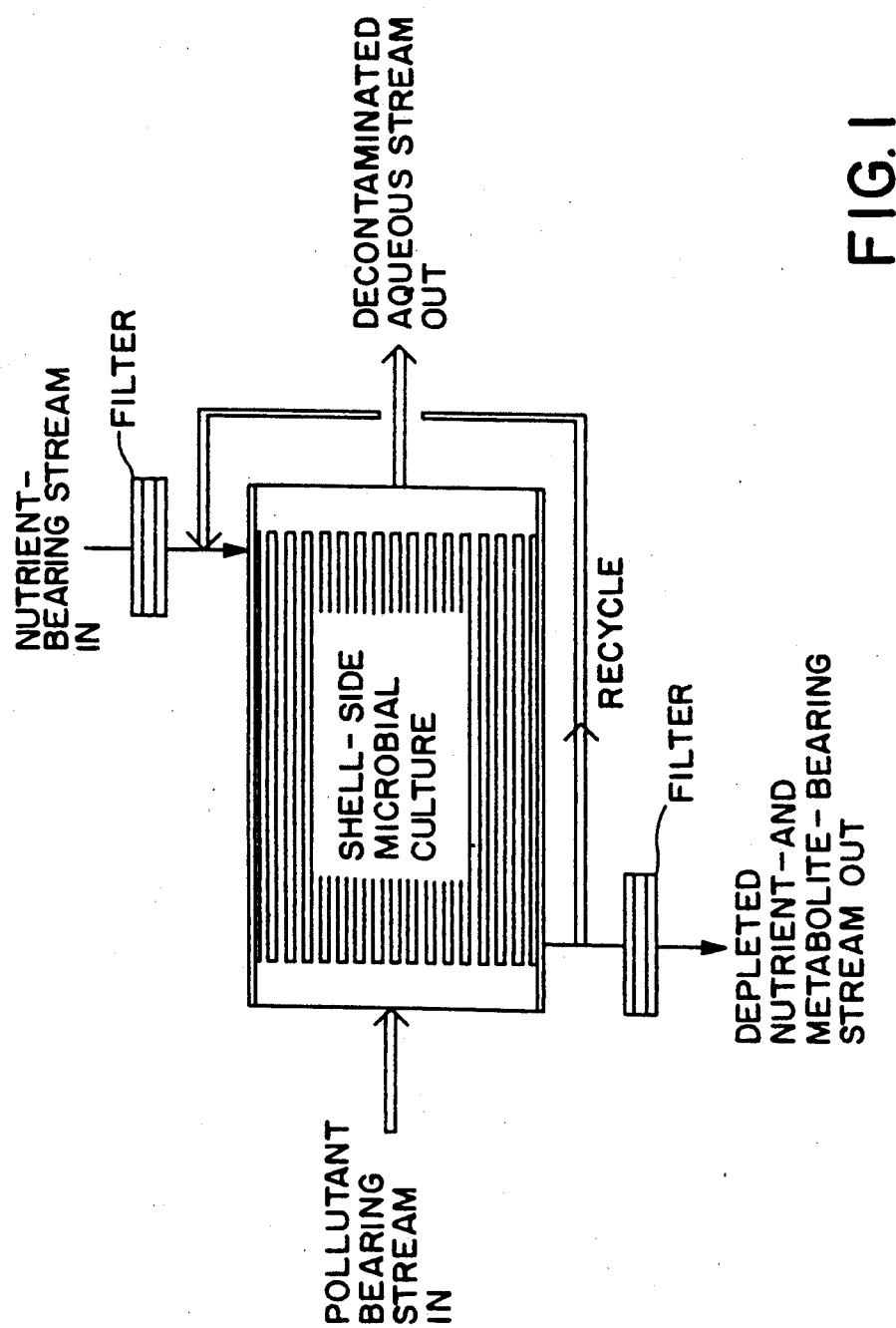
FIG. 1 is a schematic view of a bioreactor used in practicing the method of the present invention and comprising a plurality of hollow fiber membranes deployed in a manner to define two separate fluid compartments (e.g., the lumen side and shell or housing side of the bioreactor)

With reference to FIG. 1, the bioreactor used in the process comprises a conventional hollow fiber membrane contactor of the classical shell-and-tube geometry. The fibers should be of the smallest lumen diameter and wall thickness which will allow free passage of particulates present in the waste stream, and which will withstand the low hydrostatic pressures which are required to pass waste solution to be treated through the lumens of the fibers. The membrane material selected for the fibers is either (a) a finely microporous solid whose pore surfaces are preferentially oil-wettable (whose pores are filled with a water immiscible organic liquid in which the (oily) pollutant present in the waste stream is highly soluble); or (b) a homogeneous, lipophilic polymer in which the pollutant has high intrinsic solubility.

The microorganisms selected for the desired detoxification are inoculated into the shell side of the reactor in suspension in an appropriate growth medium. Although others may be used, suitable microorganisms include *E.coli* mycobacteria, microbial consortia, and recombinant microorganisms. The interfiber spacing within the unit is controlled to provide dense proliferation of the biomass between the fibers with minimal free space. Where feasible, membrane materials and growth conditions will be selected to favor preferential cell growth and adherence to the external surfaces of the fibers. The shell side compartment of the reactor is fitted with a feed and effluent line, permitting continuous delivery of aqueous nutrient medium and removal of spent medium. The lumen side compartment of the reactor is fitted with a feed and effluent line, permitting continuous delivery of the aqueous waste stream and removal of the detoxified aqueous waste stream.

Figure 2:
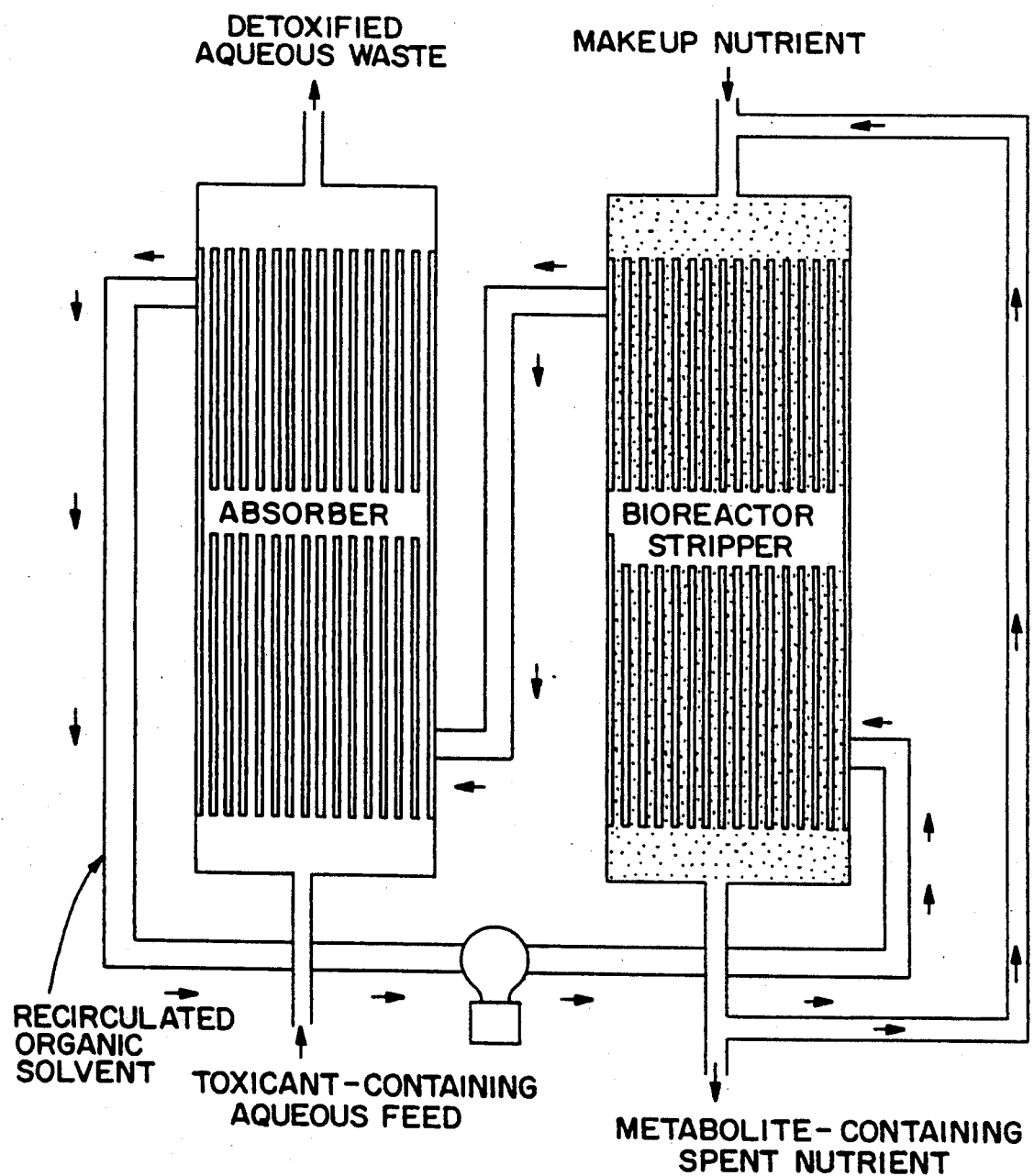
FIG. 2 is a schematic view of a second bioreactor used in practicing the method of the present invention which incorporates two hollow fiber membrane modules.

Another embodiment of the process concept of the invention consists of two independent hollow fiber membrane modules connected together as shown in FIG. 2. The first module (the "stripper") contains a bundle of preferentially-oil-wettable, microporous wall, hollow fiber membranes. The aqueous solution containing the organic solute or toxicant of interest is caused to flow through the fiber lumens, while a water immiscible organic solvent in which the solute or toxicant is preferentially soluble is caused to flow through the shell space of this module. The second module (the "bioextractor") comprises a bundle of hollow fiber membranes which are permeable to the toxicant or organic solute of interest. The organic solvent containing that component extracted from the first module is caused to flow through the lumens of the fibers in the second module, and then returned to the shell space of the first module. The component of interest is selectively transferred from the organic solvent phase through the membrane walls to the shell space. Microorganisms capable of metabolizing that component are cultured in the shell space of the second module, and appropriate nutrient solution is delivered to that compartment to support the organisms. The effluent of the shell space compartment provides means for removal of the resulting metabolites. In this manner, the toxicant or solute of interest is selectively transferred from the aqueous stream initially containing it to the microbial population capable of metabolizing it without contamination of the microbial culture by other solutes present in the aqueous feed, and/or loss of water soluble nutrient components from the medium surrounding the microorganisms to the aqueous feed stream.

The second embodiment of the process is to be preferred if the rate of transport of toxicant or solute of interest from the aqueous feed stream is substantially different from (either greater or less than) the rate at which the microorganism population selected for the transformation can convert the substrate component into the desired metabolite since it permits independent control of the size of the membrane transport device and that of the microorganism-containing bioreactor. The use of a recirculating organic liquid as a means for transporting the desired solute from the aqueous feed to the microbial population carrying out the transformation also permits greater control over the transport selectivity of the system than may be achieved by selection of the proper composition and structure of the hollow fiber membrane for a single selective extraction/biotransformation bioreactor.

In operation, toxicant-containing aqueous waste (prefiltered if necessary to remove oversize particulates) is fed continuously to the fiber lumen side of the reactor of FIG. 1, while nutrient medium is fed continuously at a controlled rate to the shell side. The toxicant or other solute of interest present in solution or emulsion in the waste stream is absorbed into the membrane fiber walls where it is free to migrate toward the microorganism-containing shell space. Toxicant molecules reaching the microorganisms via membrane transport are metabolized and converted into water soluble metabolites which diffuse into the extracellular aqueous phase and are removed with the spent medium. Since the membrane walls are substantially impermeable to highly water soluble solutes, nutrient components and waste metabolites present in the shell side fluid are prevented from leaking into the lumen side waste stream, and any water soluble components present initially in the waste stream are similarly prevented from passing into the shell space. Nutrient feed to the shell side compartment should be prefiltered through a sterilizing membrane filter to prevent microbial contamination of the immobilized biomass, as should the shell side effluent stream to avoid liberation of microorganisms into the environment.

If a microporous membrane is employed, it is essential that the pore volume be completely filled with water immiscible liquid in order to prevent bulk flow of aqueous solution (or diffusion of water soluble components) between compartments. If the dispersed organic liquid content of the waste stream is either too low or too variable to insure that this condition is satisfied, it will be necessary to introduce continuously into the waste feed an emulsion of a non-toxic but biodegradable oil (e.g., hexadecane) which will preferentially wet and fill the membrane pores. Any toxicant present in aqueous solution, or in dispersion, will partition into or comingle with the added oil, and thus be transported across the membrane with it.

Since the nutrient stream and toxicant-containing waste stream are completely decoupled from one another in the reactor (except for toxicant transport between compartments), it will be possible to independently control the flow rate and nutrient concentration of the nutrient feed to provide a maximum rate of metabolic detoxification without waste of nutrient, and the flow rate of the waste stream to maximize throughput and detoxification efficiency. If the primary metabolites of detoxification are mineral residues (e.g., carbon dioxide and hydrochloric acid) the nutrient supply loop can be closed via recycling of depleted nutrient, addition of nutrient concentrate to the recycling line, and in-line removal of accumulating electrolytes by ion exchange or electrodialysis. This would assure economic operation of the system even if cell maintenance required the presence of costly metabolic enhancers or suppressors.

Representative hollow fiber membranes contemplated for use in the bioreactor process of the invention include but are not limited to: (1) microporous polyolefin or nylon hollow fibers manufactured by AKSO/Enka, under the trade name "ACCUREL", (2) microporous polypropylene hollow fibers manufactured by Hoechst/Celanese (Vestar) under the trade name "CELGARD", (3) microporous polysulfone hollow fibers manufactured by several U.S. and foreign membrane suppliers, (4) microporous thin-walled PTFE (GORETEX) hollow fibers, (5) microporous alumina tubular membranes manufactured by Norton Company and Alcoa (surface-treated to render them hydrophobic), (6) nonporous, thin-walled cellulose ester hollow fibers, (7) nonporous, thin-walled plasticized polyvinyl chloride hollow fibers, (8) nonporous, thin-walled polyurethane elastomer hollow fibers, (9) nonporous thin-walled ethylene/vinyl acetate hollow fibers, and (10) nonporous, thin-walled polytetrafluoroethylene hollow fibers.

It will be understood that various details of the invention may be changed without departing from the scope of the invention. Furthermore, the foregoing description is for the purpose of illustration only, and not for the purpose of limitation—the invention being defined by the claims.

What is claimed is:

1. A process for continuously removing selected organic toxicants or other oleophilic solutes from an aqueous process stream by employing microorganisms in a hollow fiber membrane module to metabolize said solutes into water soluble metabolites, said module comprising a lumen side and a housing side with said microorganisms being located in said housing side thereof, said process comprising:

continuously providing a fluid process stream containing a low water solubility toxicant or other oleophilic solute therein to the lumen side of a permeably selective hollow fiber membrane module;

continuously providing an aqueous nutrient stream comprising a water soluble nutrient to the housing side of said hollow fiber membrane module;

selectively transporting said solute through the hollow fiber membrane of said module to said microorganisms to be metabolized thereby while preventing transportation of said water soluble nutrient and metabolite in said housing side through said hollow fiber membrane into said lumen side, said hollow fiber membrane further serving to concentrate said solute therein during said transportation therethrough;

continuously removing said solute depleted fluid process stream from said lumen side of said hollow fiber membrane module; and continuously removing said aqueous nutrient stream and metabolites contained therein from the housing side of said hollow fiber membrane module.

2. A process according to claim 1 wherein the flow rate of said fluid process stream and said aqueous nutrient stream are independently controlled to maximize the efficiency of said process within said hollow fiber membrane module.

3. A process according to claim 1 wherein said solute in said fluid process stream comprises chlorinated hydrocarbon.

4. A process according to claim 1 wherein said fluid process stream contains between about 5 and 10,000 ppm of said solute.

5. A process according to claim 1 including the step of filtering said aqueous nutrient stream provided to said module through a sterilizing membrane filter to prevent microbial contamination of said microorganisms.

6. A process according to claim 1 wherein said hollow fiber membrane comprises a microporous membrane wherein the micropores are filled with a water immiscible liquid in which said solute is preferentially soluble to facilitate selective transport of said toxicant therethrough.

7. A process according to claim 6 wherein said microporous membrane is selected from the group consisting of microporous polyolefin, microporous nylon, microporous polypropylene, microporous polysulfone, microporous PTFE, and microporous alumina.

8. A process according to claim 1 wherein said hollow fiber membrane comprises a homogeneous, lipophilic polymer in which said solute is highly intrinsically soluble.

9. A process according to claim 8 wherein said polymer is selected from the group consisting of nonporous cellulose ester, nonporous plasticized polyvinyl chloride, nonporous polyurethane elastomer, nonporous ethylene vinyl acetate, and nonporous polytetrafluorethylene.

10. A process according to claim 1 wherein said microorganism is selected from the group consisting of *E. coli*, mycobacteria, microbial consortia, and recombinant microorganisms.

11. A process according to claim 1 including the step of filtering said aqueous nutrient stream removed from the housing side of said hollow fiber membrane module through a sterilizing membrane filter.

12. A process according to claim 1 including the step of recycling said aqueous nutrient stream when said metabolites are substantially mineral residues, said aqueous nutrient stream being replenished with nutrient and electrolytes removed therefrom prior to reintroduction into said housing side of said fiber membrane module.

13. A process according to claim 1 wherein said fluid process stream is an aqueous stream.

14. A process according to claim 1 wherein said fluid process stream is a water immiscible organic solvent.

15. A process according to claim 14 wherein said water immiscible organic solvent process stream is supplied from a hollow fiber membrane module comprising one or more selectively permeable hollow fiber membranes and having a lumen side and a housing side, said lumen side being provided with an aqueous process stream containing said solute and said housing side being provided with a water immiscible organic solvent stream which serves to receive said solute selectively transported through the hollow fiber membrane of said module.

16. A process for continuously removing selected organic toxicants or other oleophilic solutes from a fluid process stream by employing microorganisms in a hollow fiber membrane module to metabolize said toxicants into water soluble metabolites, said module comprising a lumen side and a housing side with said microorganisms being located in said housing side thereof, said process comprising:

continuously providing a fluid process stream containing a low water solubility toxicant or other oleophilic solute therein to the lumen side of a permeably selective hollow fiber membrane module, said process stream containing between about 5 and 10,000 ppm of said toxicant;

continuously providing an aqueous nutrient stream comprising a water soluble nutrient to the housing side of said hollow fiber membrane module;

selectively transporting said solute through the hollow fiber membrane of said module, to said microorganisms to be metabolized thereby while preventing transportation of said water soluble nutrient and metabolite in said housing side through said hollow fiber membrane into said lumen side, said hollow fiber membrane further serving to concentrate said solute therein during said transportation therethrough and comprising a material selected from the group consisting of a microporous membrane wherein the micropores are filled with a water immiscible liquid in which said solute is preferentially soluble to facilitate selective transport of said solute therethrough and a homogeneous, lipophilic polymer in which said toxicant is highly intrinsically soluble;

continuously removing said solute depleted fluid process stream from said lumen side of said hollow fiber membrane module; and continuously removing said aqueous nutrient stream and metabolites contained therein from the housing side of said hollow fiber membrane module.

17. A process according to claim 16 wherein the flow rate of said fluid process stream and said aqueous nutrient stream are independently controlled to maximize the efficiency of said process within said hollow fiber membrane module.

18. A process according to claim 16 wherein said organic solute in said fluid process stream comprises a chlorinated hydrocarbon.

19. A process according to claim 16 including the step of filtering said aqueous nutrient stream provided to said module through a sterilizing membrane filter to prevent microbial contamination of said microorganisms.

20. A process according to claim 16 wherein said microporous membrane is selected from the group consisting of microporous polyolefin, microporous nylon, microporous polypropylene, microporous polysulfone, microporous PTFE, and microporous alumina.

21. A process according to claim 16 wherein said polymer is selected from the group consisting of nonporous cellulose ester, nonporous plasticized polyvinyl chloride, nonporous polyurethane elastomer, nonporous ethylene vinyl acetate and nonporous polytetrafluorethylene.

22. A process according to claim 16 wherein said microorganism is selected from the group consisting of *E. coli*, mycobacteria, microbial consortia, and recombinant microorganisms.

23. A process according to claim 16 including the step of filtering said aqueous nutrient stream removed from the housing side of said hollow fiber membrane module through a sterilizing membrane filter.

24. A process according to claim 16 including the step of recycling said aqueous nutrient stream when said metabolites are substantially mineral residues, said aqueous nutrient stream being replenished with nutrient and electrolytes removed therefrom prior to reintroduction into said housing side of said fiber membrane module.

25. A process according to claim 16 wherein said fluid process stream is an aqueous stream.

26. A process according to claim 16 wherein said fluid process stream is a water immiscible organic solvent.

27. A process according to claim 26 wherein said water immiscible organic solvent process stream is supplied from a hollow fiber membrane module comprising one or more selectively permeable hollow fiber membranes and having a lumen side and a housing side, said lumen side being provided with an aqueous process stream containing said solute and said housing side being provided with a water immiscible organic solvent stream which serves to receive said solute selectively transported through the hollow fiber membrane of said module.

* * * * *